US008631197B2

(12) United States Patent
Hall

(10) Patent No.: US 8,631,197 B2
(45) Date of Patent: Jan. 14, 2014

(54) IMPLEMENTING ENHANCED UPDATES FOR INDIRECTION TABLES

(75) Inventor: David Robison Hall, Rochester, MN (US)

(73) Assignee: HGST Netherlands B.V., Amsterdam (NL)

( * ) Notice: Subject to any disclaimer, the term of this patent is extended or adjusted under 35 U.S.C. 154(b) by 340 days.

(21) Appl. No.: 13/207,935

(22) Filed: Aug. 11, 2011

(65) Prior Publication Data

US 2012/0303884 A1 Nov. 29, 2012

Related U.S. Application Data

(60) Provisional application No. 61/489,174, filed on May 23, 2011.

(51) Int. Cl.
*G06F 12/02* (2006.01)
(52) U.S. Cl.
USPC ................................. 711/112; 711/4; 711/202
(58) Field of Classification Search
None
See application file for complete search history.

(56) References Cited

U.S. PATENT DOCUMENTS

| | | | |
|---|---|---|---|
| 6,091,723 A | 7/2000 | Even | |
| 6,314,473 B1 | 11/2001 | Singer et al. | |
| 6,378,037 B1 | 4/2002 | Hall | |
| 6,823,442 B1 * | 11/2004 | Cameron | 711/220 |
| 2009/0019216 A1 * | 1/2009 | Yamada et al. | 711/103 |
| 2010/0281191 A1 * | 11/2010 | Zwisler et al. | 710/36 |
| 2011/0058277 A1 | 3/2011 | de la Fuente et al. | |

OTHER PUBLICATIONS

"Minimization of erase-band in shingled PMR with asymmetric writer" by Ikuya Tagawa et al, J. Magn. Magn. Mater. (2010), doi:10.1016/j.jmmm.2010.11.093.
AT Attachment with Packet Interface—7 vol. 1—Register Delivered Command Set, Logical Register Set Approved Feb. 7, 2005 American National Standards Institute, Inc. (ATA/ATAPI-7 V1).
http://en.wikipedia.org/wiki/Big_O_notation May 10, 2011.
http://www.leepoint.net/notes-java/algorithms/big-oh/bigoh.html, Java Notes, "Algorithms:Big-oh Notation".

* cited by examiner

*Primary Examiner* — Gary Portka
(74) *Attorney, Agent, or Firm* — Joan Pennington

(57) ABSTRACT

A method and a storage system are provided for implementing indirection tables and providing enhanced updates of the indirection tables for persistent media or disk drives, such as shingled perpendicular magnetic recording (SMR) indirection tables. A plurality of memory pools are used to store indirection data. An exception pointer table provides a pointer to an exception list for an I-Track. The exception list includes predetermined-size exception entries sorted by an offset from a start of the I-Track. An insert exception entry is provided for a new host write and merged to an updated exception list using an offset of the insert exception entry.

20 Claims, 16 Drawing Sheets

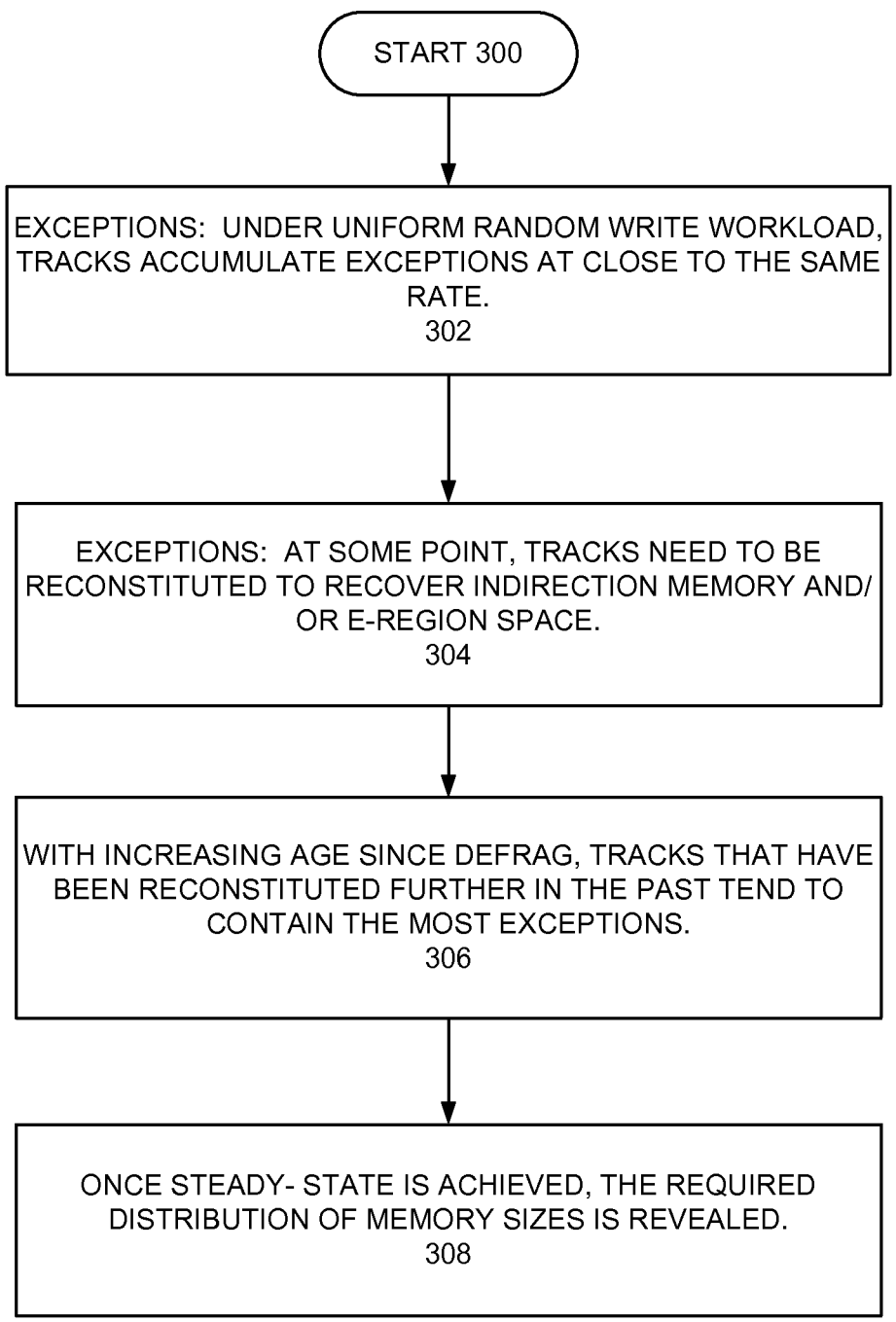

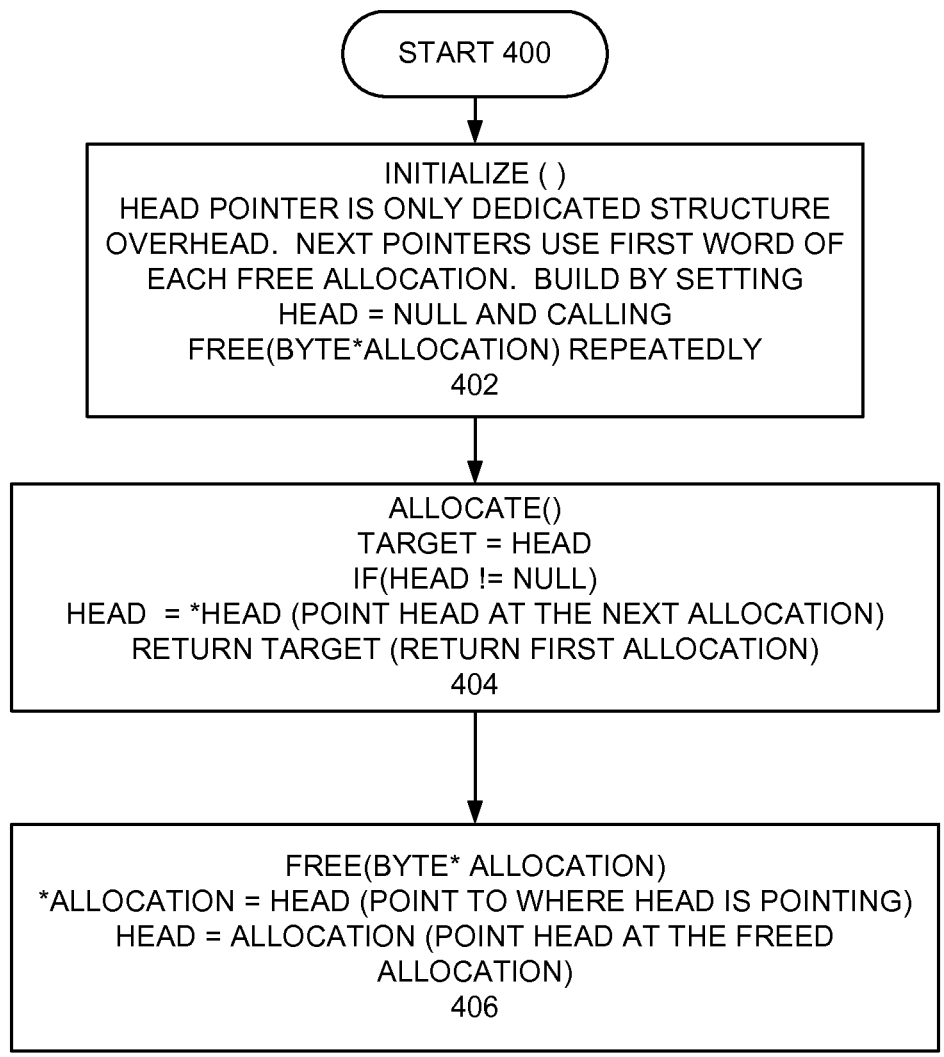

CONTEXT DROPS 600
EPO-SAFE BUFFER 602
(256B)
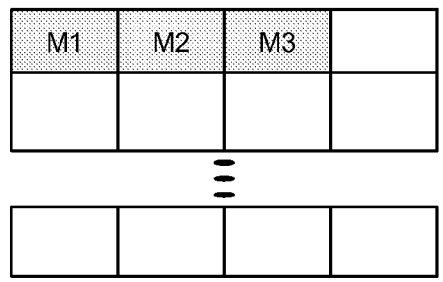
CHAINING OF INDIRECTION DATA 610
(HOST WRITE COMMAND METADATA BLOCKS)
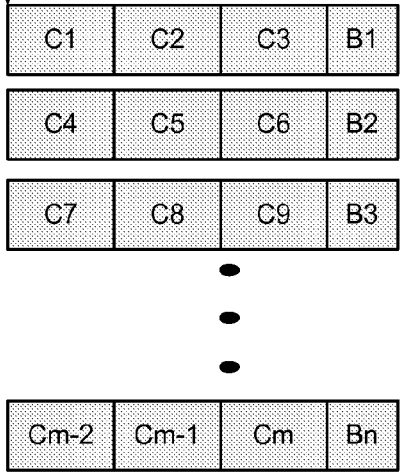
HOST WRITE COMMAND: Cn      METADATA BLOCKS: Bn
FIG. 6

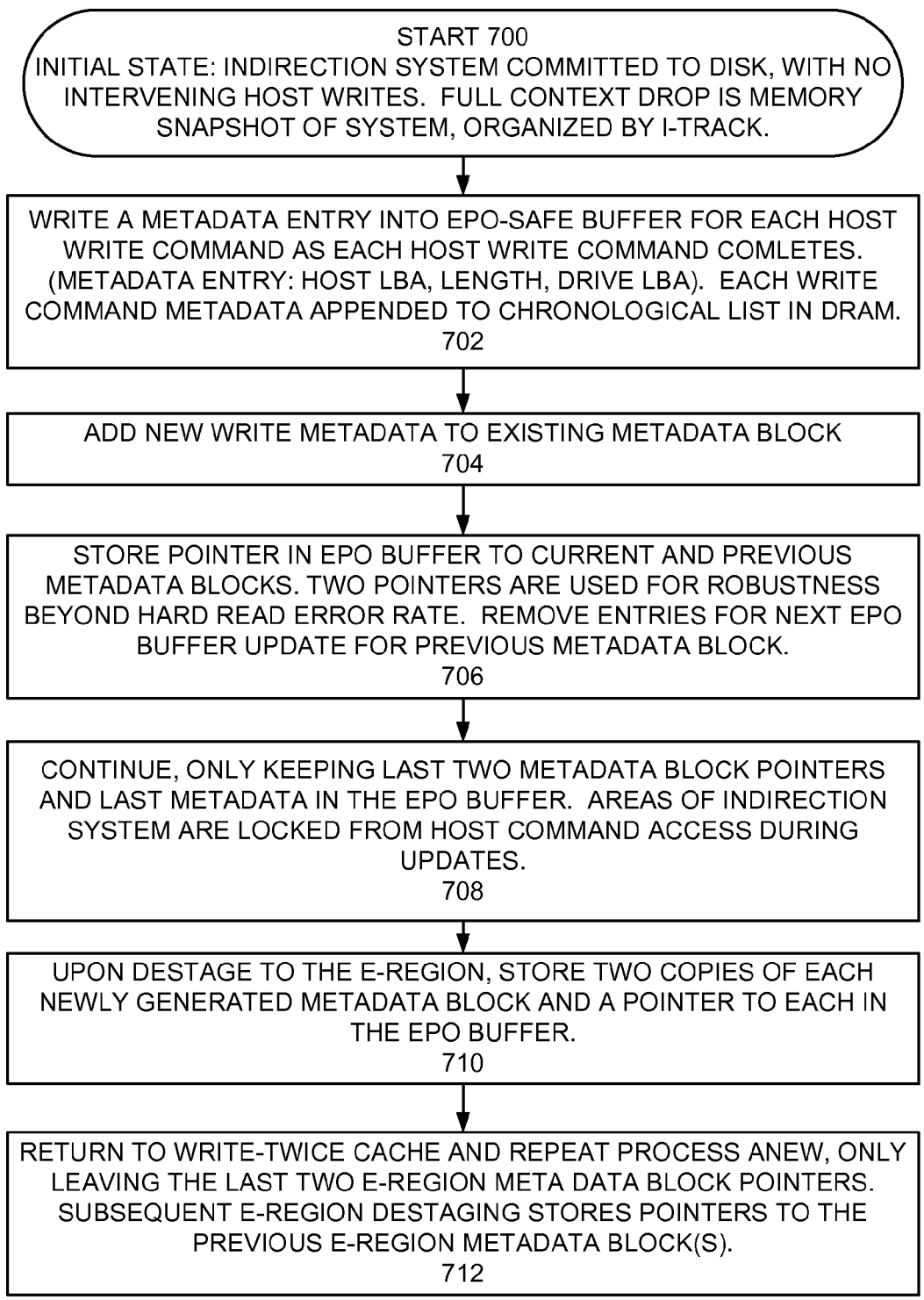

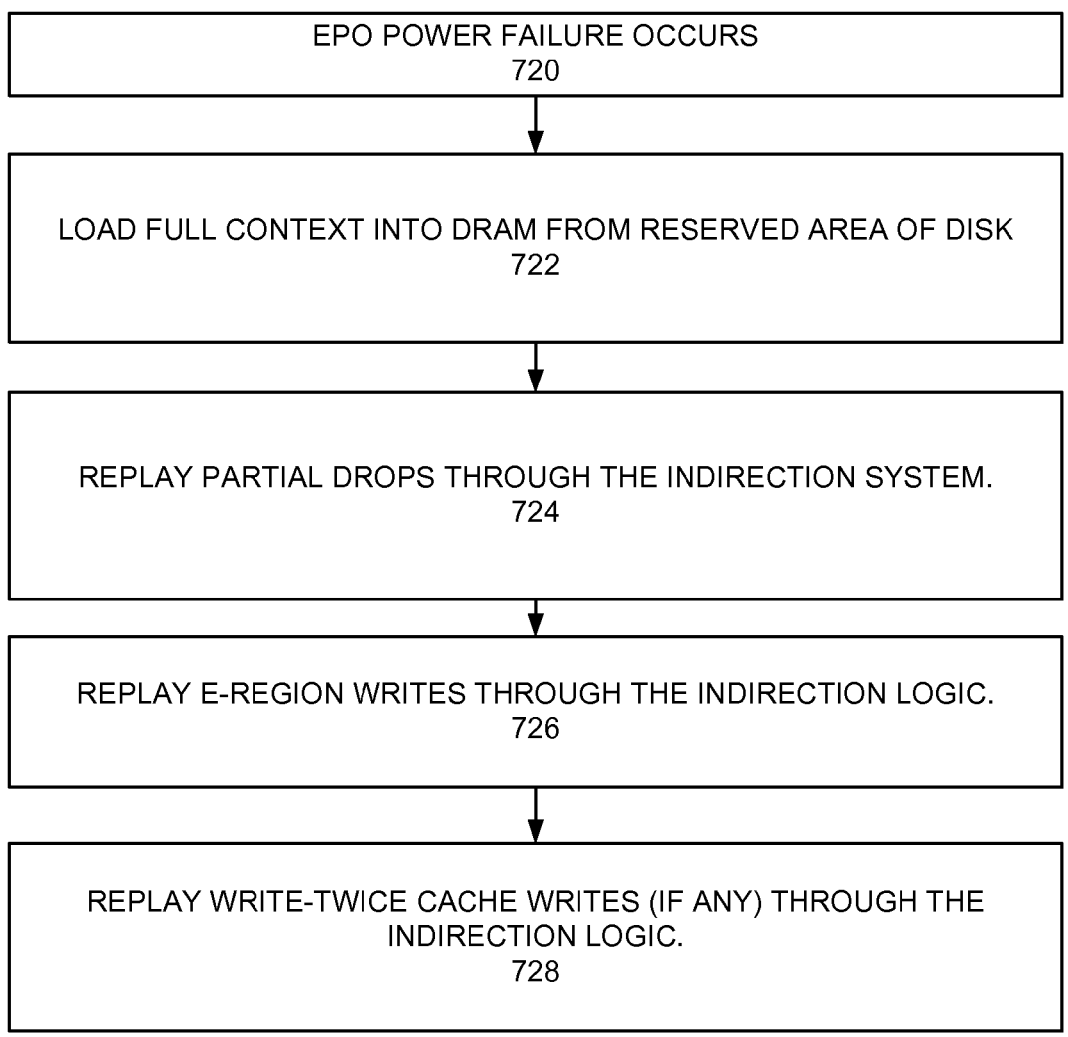

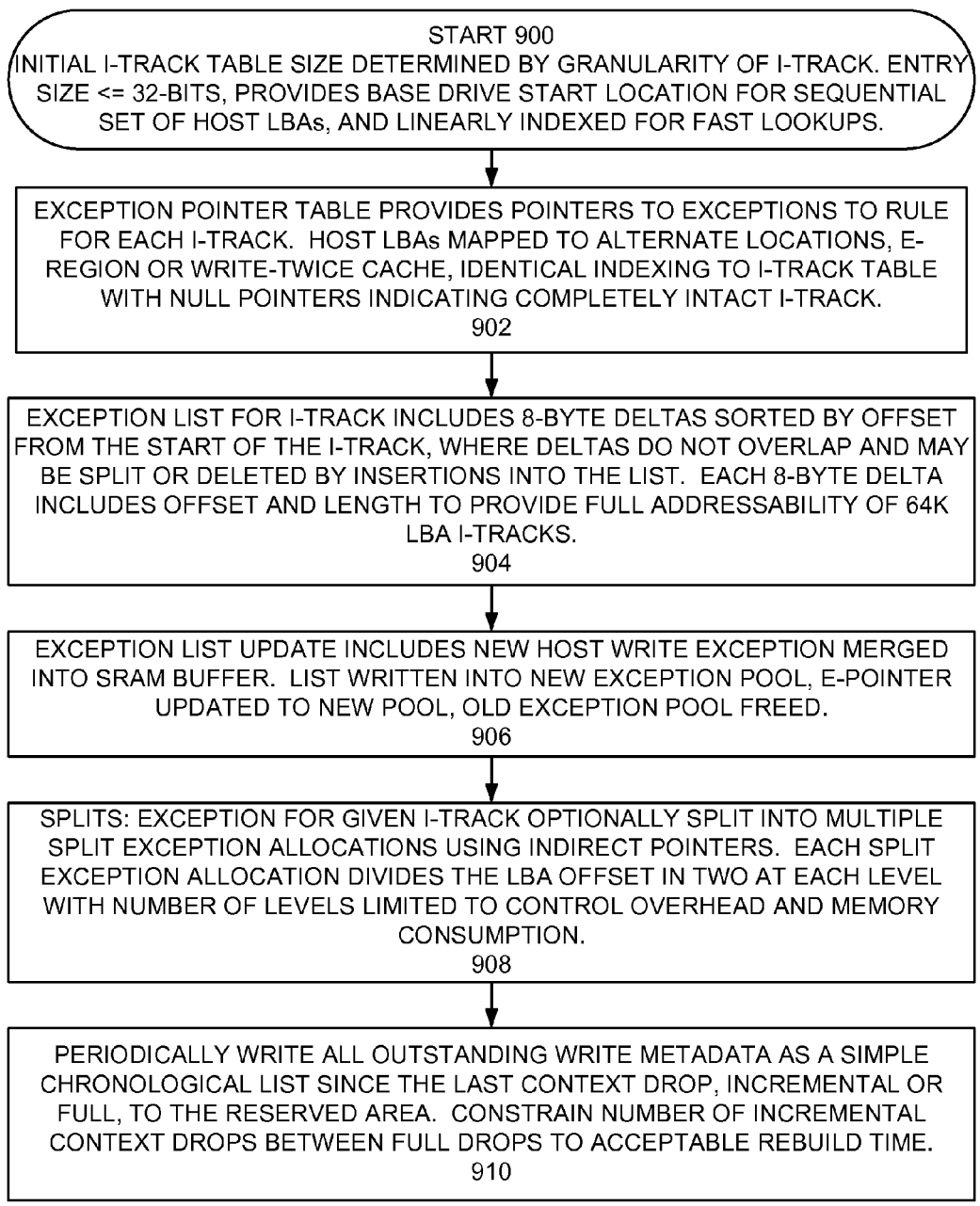

IMPLEMENTING ENHANCED UPDATES FOR INDIRECTION TABLES

This application claims the benefit of U.S. Provisional Application No. 61/489,174 filed on May 23, 2011, entitled "Shingled Magnetic Recording Hard Drive."

RELATED APPLICATIONS

Related applications by the present inventor and present assignee are being filed on the same day herewith including:
Ser. No. 13/207,852, entitled "IMPLEMENTING ENHANCED EPO PROTECTION FOR INDIRECTION DATA"; and
Ser. No. 13/207,740, entitled "IMPLEMENTING ENHANCED DETERMINISTIC MEMORY ALLOCATION FOR INDIRECTION TABLES".

FIELD OF THE INVENTION

The present invention relates generally to the data storage field, and more particularly, relates to a method and apparatus for implementing indirection tables and providing fast updates of the SMR indirection tables for persistent media or hard disk drives (HDDs), such as, indirection tables and providing fast updates of the indirection tables for shingled perpendicular magnetic recording (SMR) in a Shingled Disk Drive (SDD), for an indirection perpendicular magnetic recording (PMR) disk drive, or for various other blocked based addressing persistent media devices.

DESCRIPTION OF THE RELATED ART

As used in the following description and claims, the following terms should be broadly understood as follows:
  A Shingled Disk Drive (SDD) is a hard disk drive recording magnetic patterns of data on a writable disk surface in overlapping circular tracks using shingled perpendicular magnetic recording (SMR), also referred to as a SMR drive.
  An Indirection System and I-Track algorithm are based on rules and exceptions, where Indirection is the mapping of one block address space to another address space, for example, from host Logical Block Addresses (LBAs) to another block address space for persistent media, and I-Track is the Host and drive sequential set of Logical Block Addresses (LBAs), each of which may or may not be valid.
  The rule is the I-Track, a fixed-length set of host LBAs that is sequential in both host and drive space, which is located and processed in an I-Region, and metadata including a single drive start LBA. At any given time, typically more than 95% of the drive's LBAs are mapped this way.
  The exception to the rule is called a Delta or Exception. The Delta or Exception is a single entry in the indirection system that describes the mapping of a contiguous sequence of LBAs from host to drive space. The exception is located in a Write-Twice Cache, or an Exception Region (E-Region), with one of the Write-Twice Cache or the E-Region being the official location, and metadata consisting of a host start LBA, a length and a drive LBA. On each host read, a check is made to the indirection system to determine if all or part of the request is contained in one or more exceptions, and the request is assembled from one or more pieces and sent to the host.
  Logical defragmentation (L-defrag) is the rewriting of data to reduce an indirection table size, which is accomplished by gathering randomly written data and rewriting sequentially.
  Physical defragmentation (P-defrag) is the rewriting of data to a sequential form to free contiguous sections of drive space.

Many data processing applications require long-term data storage and typically a high-degree of data integrity. Typically these needs are met by non-volatile data storage devices. Non-volatile storage or persistent media can be provided by a variety of devices, most commonly, by direct access storage devices (DASDs), which also are referred to as hard disk drives (HDDs), and advantageously includes SDDs to achieve high track density.

U.S. Pat. No. 6,378,037 issued Apr. 23, 2002 and entitled Write-twice method of fail-safe write caching, by the present inventor, David Robison Hall, discloses a method and a system having at least one direct access storage device with at least one surface formatted in a plurality of concentric tracks, there being a respective transducer for each formatted surface, and wherein the direct access storage device has an associated electronic write cache memory, the method comprising: providing cache blocks on the at least one surface; storing data from an initiator to be written to the direct access storage device in the associated electronic write cache memory; whenever a direct access storage device seek operation is in progress, completing the seek operation and, during any latency time, writing at least some of the data stored in the electronic write cache memory to the cache blocks until all the data stored in the electronic write cache memory is written to the cache blocks; and after all the data stored in the electronic write cache memory is written to the cache blocks, notifying the initiator that the data has been written to the direct access storage device. Fail-safe write caching is provided for a direct access storage device (DASD) without the need for any additional hardware by utilizing specially arranged portions of the disks to write the cached data during DASD idle time before finally writing the data to its intended ultimate disk location.

U.S. Ser. No. 12/797,683 filed Jun. 10, 2010 entitled IMPLEMENTING ENHANCED STORAGE MAPPING WITH COMPOSITION INDIRECTION FOR PERSISTENT MEDIA INCLUDING SOLID STATE DRIVES, by the present inventor, David Robison Hall, discloses a method and storage system for implementing host to physical mapping for persistent media including flash memory. Numerical compositions at multiple granularities are used to store the host to physical mappings. A plurality of groupings, each grouping including a fixed number of blocks is encoded using recursive composition, eliminating the need to store separate lengths.

A need exists for an effective and efficient mechanism to implement indirection tables for address mapping while providing fast updates of indirection tables, and providing emergency power outage (EPO) protection for indirection data.

SUMMARY OF THE INVENTION

Aspects of the present invention are to provide a method and a storage system for implementing indirection tables and providing fast updates of the indirection tables for persistent media or hard disk drives (HDDs). Other important aspects of the present invention are to provide such method and storage system substantially without negative effect and to overcome some of the disadvantages of prior art arrangements.

In brief, a method and a storage system are provided for implementing indirection tables and providing enhanced updates of the indirection tables for persistent media or disk drives, such as shingled perpendicular magnetic recording (SMR) indirection tables. A plurality of memory pools are used to store indirection data. An exception pointer table provides a pointer to an exception list for an I-Track. The exception list includes predetermined-size exception entries sorted by an offset from a start of the I-Track. An insert exception entry is provided for a new host write and merged to an updated exception list using an offset of the insert exception entry.

BRIEF DESCRIPTION OF THE DRAWINGS

The present invention together with the above and other objects and advantages may best be understood from the following detailed description of the embodiments of the invention illustrated in the drawings, wherein:

FIGS. 3, and 4 are flow charts illustrating example operations of the system of FIG. 1 for implementing deterministic memory allocation for shingled perpendicular magnetic recording (SMR) indirection tables in accordance with embodiments of the invention;

FIG. 6 is a diagram illustrating example context drops and operations of the system of FIG. 1 for implementing efficient emergency power outage (EPO) protection for shingled perpendicular magnetic recording (SMR) indirection data using data pointers in accordance with embodiments of the invention;

FIGS. 7A, and 7B are flow charts illustrating example operations of the system of FIG. 1 for implementing efficient EPO protection for shingled perpendicular magnetic recording (SMR) indirection data using data pointers in accordance with embodiments of the invention;

FIG. 9 is a flow chart illustrating example operations of the system of FIG. 1 for implementing fast SMR indirection table updates in accordance with embodiments of the invention;

DETAILED DESCRIPTION OF THE EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the embodiments of the invention, methods and a storage system are provided for implementing deterministic memory allocation for indirection tables, such as shingled perpendicular magnetic recording (SMR) indirection tables, emergency power outage (EPO) protection for indirection data using data pointers, and for efficiently providing fast indirection updates.

Figure 1:
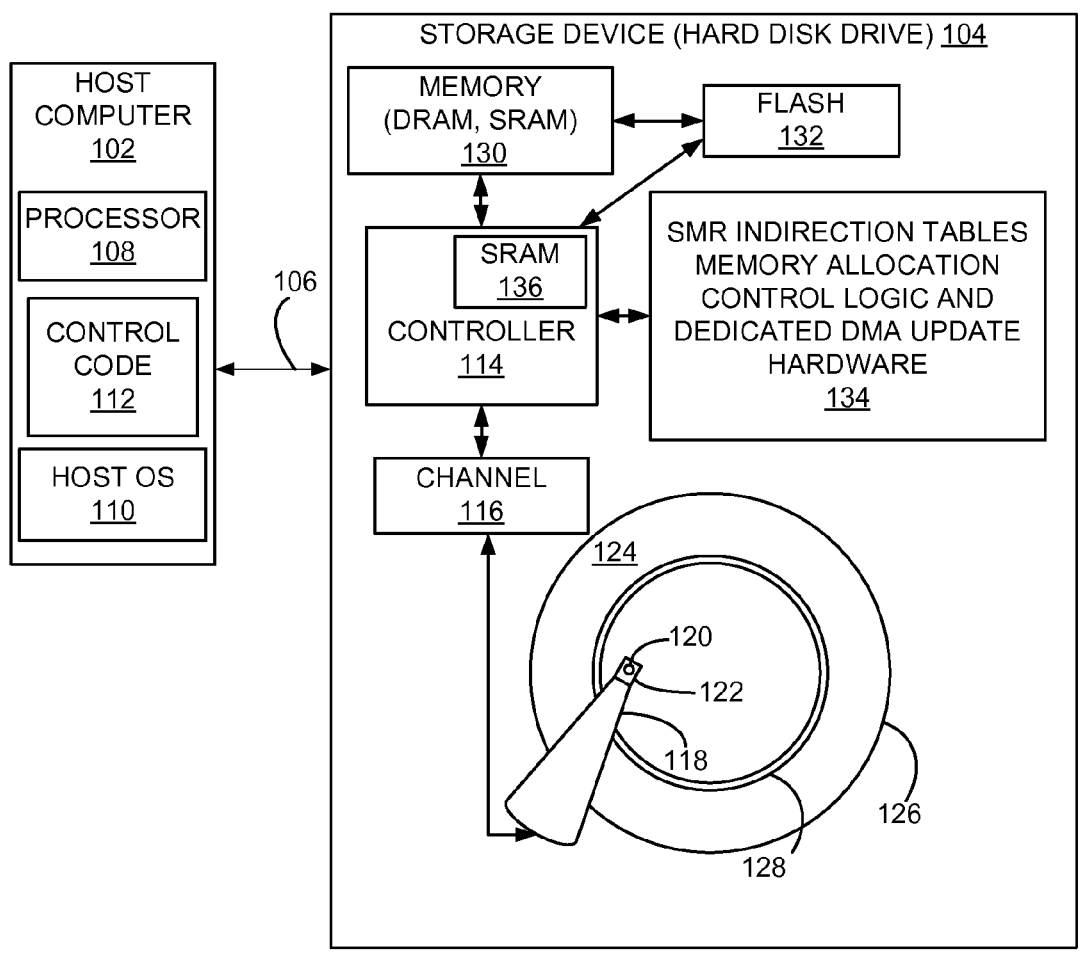
FIG. 1 is a block diagram representation of a storage system for implementing deterministic memory allocation for indirection tables, such as shingled perpendicular magnetic recording (SMR) indirection tables, emergency power outage (EPO) protection for indirection data using data pointers, and for efficiently providing fast indirection updates in accordance with an embodiment of the invention.

Having reference now to the drawings, in FIG. 1, there is shown an example system generally designated by the reference character 100 for implementing deterministic memory allocation for indirection tables, such as shingled perpendicular magnetic recording (SMR) indirection tables, emergency power outage (EPO) protection for indirection data using data pointers, and for efficiently providing fast indirection updates for persistent media in accordance with an embodiment of the invention. System 100 includes a host computer 102, a storage device 104, such as a Shingled Disk Drive (SDD) 104, and an interface 106 between the host computer 102 and the storage device 104.

As shown in FIG. 1, host computer 102 includes a processor 108, a host operating system 110, and control code 112. The storage device or hard disk drive 104 includes a controller 114 coupled to a data channel 116. The storage device or hard disk drive 104 includes an arm 118 carrying a read/write head including a read element 120, and a write element 122.

In operation, host operating system 110 in host computer 102 sends commands and data to be written to hard disk drive 104. In response to the commands, hard disk drive 104 performs requested functions such as reading data, writing data, erasing data, and the like, on disk surface 124. The write element 122 writes magnetic patterns of data on a recordable or writable surface 124 of a disk 126. Controller circuit 114 causes write element 122 to record magnetic patterns of data on a writable surface of disk 122 in overlapping circular tracks 128 using shingled writing, such as, shingled perpendicular magnetic recording (SMR) for example, to achieve high track density.

Hard disk drive or SDD 104 includes a dynamic random access memory (DRAM) and/or a static random access memory (SRAM) 130 coupled to the controller 114 and a flash memory 132.

In accordance with features of the embodiments of the invention, SMR indirection tables memory allocation control logic and direct memory access (DMA) update hardware 134 is used to implement features of the embodiments of the invention for faster SMR indirection updating, maintaining and memory allocation of Exception Region (E-Region) or Write-Twice Cache, memory pools for SMR indirection data. Controller 114 includes a static random access memory (SRAM) 136 used for implementing emergency power outage (EPO) protection for SMR indirection data using data pointers in accordance with the invention.

In accordance with features of the embodiments of the invention, SRAM 136 such as stores a pointer to metadata stored on the disk 126 or in a flash memory 132. In the event of EPO event, critical journaling data in SRAM 136 must be written to the flash 132 or the disk-media 126. The stored pointers of the embodiments of the invention includes a small amount of critical data that is needed to be written in the event of an emergency power outage (EPO) and is cheaper to implement with small capacitor emergency power and also is more likely to be performed properly without errors.

Controller 114 can include various implementations, for example, fabricated with one or multiple integrated circuit dies. A digital video recorder (DVR), a set-top-box (STB), or various other computer system types are specific implementation of a host computer 102. While the control code 112 is shown in the host computer 102, and the controller 114 is shown in the hard disk drive 104, the control code 112 may reside in any suitable location, such as the hard disk drive 104 separate from host computer 102 and controller circuit 114 may reside in any suitable location, separate from hard disk drive 104, for example, in the host computer 102, and the like.

System 100 including the host computer 102 and the hard disk drive or SDD 104 is shown in simplified form sufficient for understanding the present invention. The illustrated host computer 102 together with the storage device or SDD 104 is not intended to imply architectural or functional limitations. The present invention can be used with various hardware implementations and systems and various other internal hardware devices.

Figure 2A:
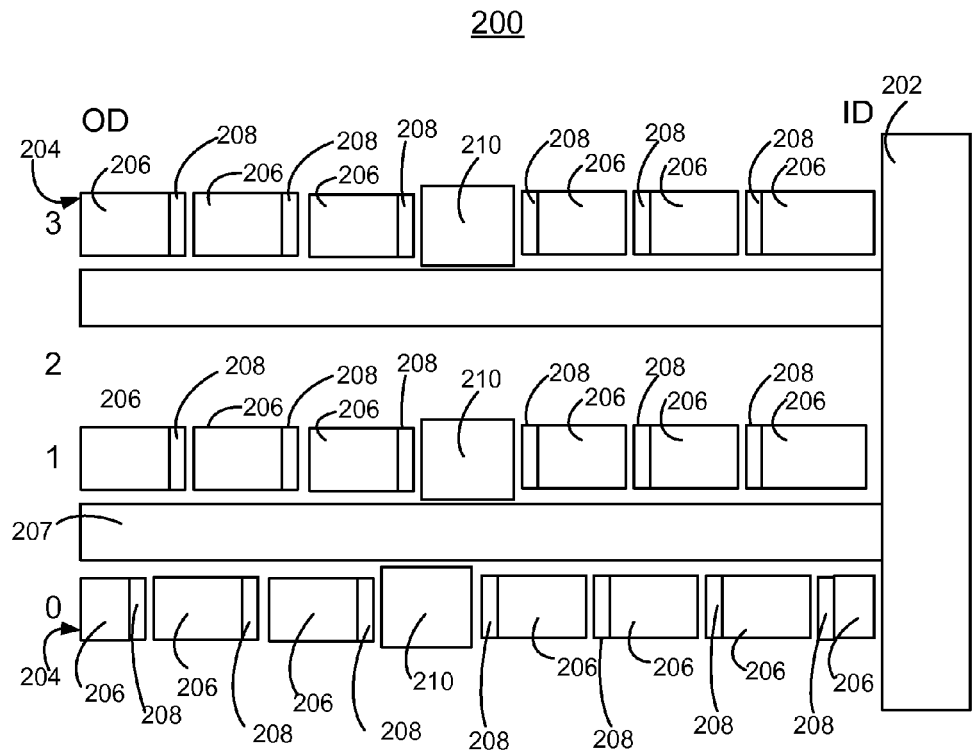
FIGS. 2A and 2B respectively schematically illustrate I-track regions, Write twice cache, and Exception Regions (E-Regions) in an example Shingled Disk Drive geometry; and a region view of a Sequential I-track Region, and Host Writes to a Write twice cache, and Exception Region in accordance with an embodiment of the invention.
Figure 2B:
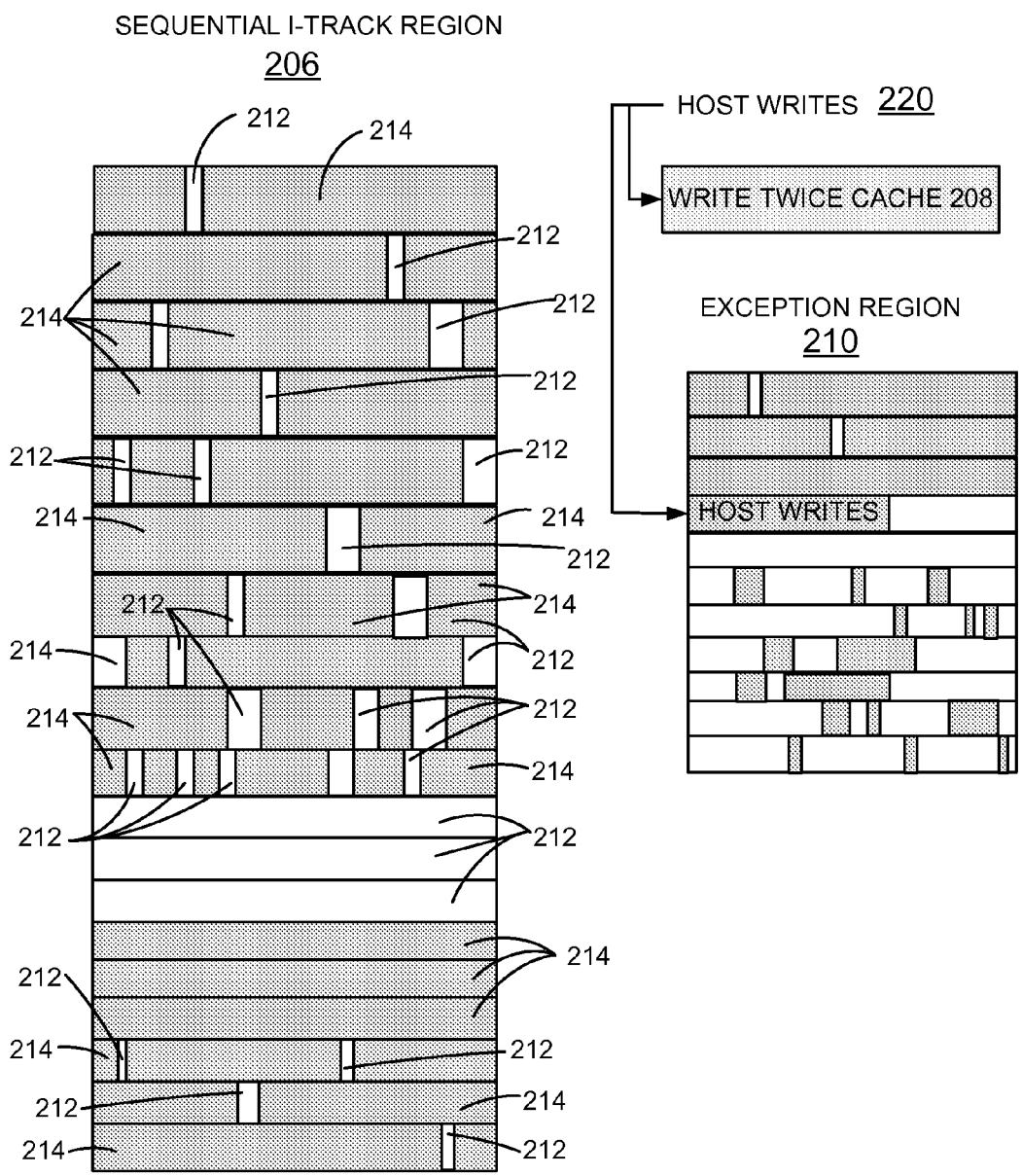

Referring also to FIGS. 2A and 2B, there are shown a respective schematically shown an example Shingled Disk Drive (SDD) geometry generally designated by the reference character 200 and a region view of a Sequential I-track Region generally designated by the reference character 206, and Host Writes to a Write twice cache, and Exception Region generally designated by the reference character 220 in accordance with an embodiment of the invention.

As shown in FIG. 2A, SDD geometry 200 includes a spindle 202 proximate to an inner diameter (ID) of a disk including a plurality of tracks 204, #0-3. A plurality of I-track regions 206 together with an associated Write-Twice Cache 208 and an Exception Region (E-Region) 210 are disposed between the ID and an outer diameter (OD) of the illustrated SDD geometry 200.

Each I-track region 206 is a head/tail circular buffer, such as ~140 I-track regions, servicing, for example, a predetermined range of LBAs. Respective 1-track buffers extend between the Write-Twice Cache 208 and I-track regions 206.

Referring to FIG. 2B, the example sequential I-track Region 206 includes a plurality of holes 212 and data 214, where the holes 212 are either unwritten or stale sequence of LBAs. For example, with write caching disable, host writes 220 are applied to the write twice cache 208 and an example exception region 210 as shown in FIG. 2B. The I-track region 206 is refreshed to remove holes 212 and make room for more exceptions in the exception region or E-region 210.

In accordance with features of the embodiments of the invention, the SMR indirection tables memory allocation control logic and direct memory access (DMA) update hardware 134 of the invention is used to implement methods for deterministic memory allocation for SMR indirection tables, for EPO protection for SMR indirection data using data pointers, and for efficiently providing fast SMR indirection updates for persistent media.

Referring to FIG. 3, operations of the system 100 for implementing deterministic memory allocation for shingled perpendicular magnetic recording (SMR) indirection tables start as indicated at a block 300. As indicated at a block 302, under a uniform random write workload, all tracks will accumulate exceptions at close to the same rate. It should be understood that the present invention is not limited to and does not require a uniform random write workload to operate, but is optimized for the uniform random write workload, since this is the more difficult workload to satisfy performance requirements. At some point, tracks will need to be reconstituted to recover Indirection memory and/or E-region space as indicated at a block 304. Tracks that have been reconstituted further in the past tend to contain the most exceptions as indicated at a block 306. Once steady-state is achieved, the required approximate distribution of memory sizes is revealed as indicated at a block 308.

Figure 5A:
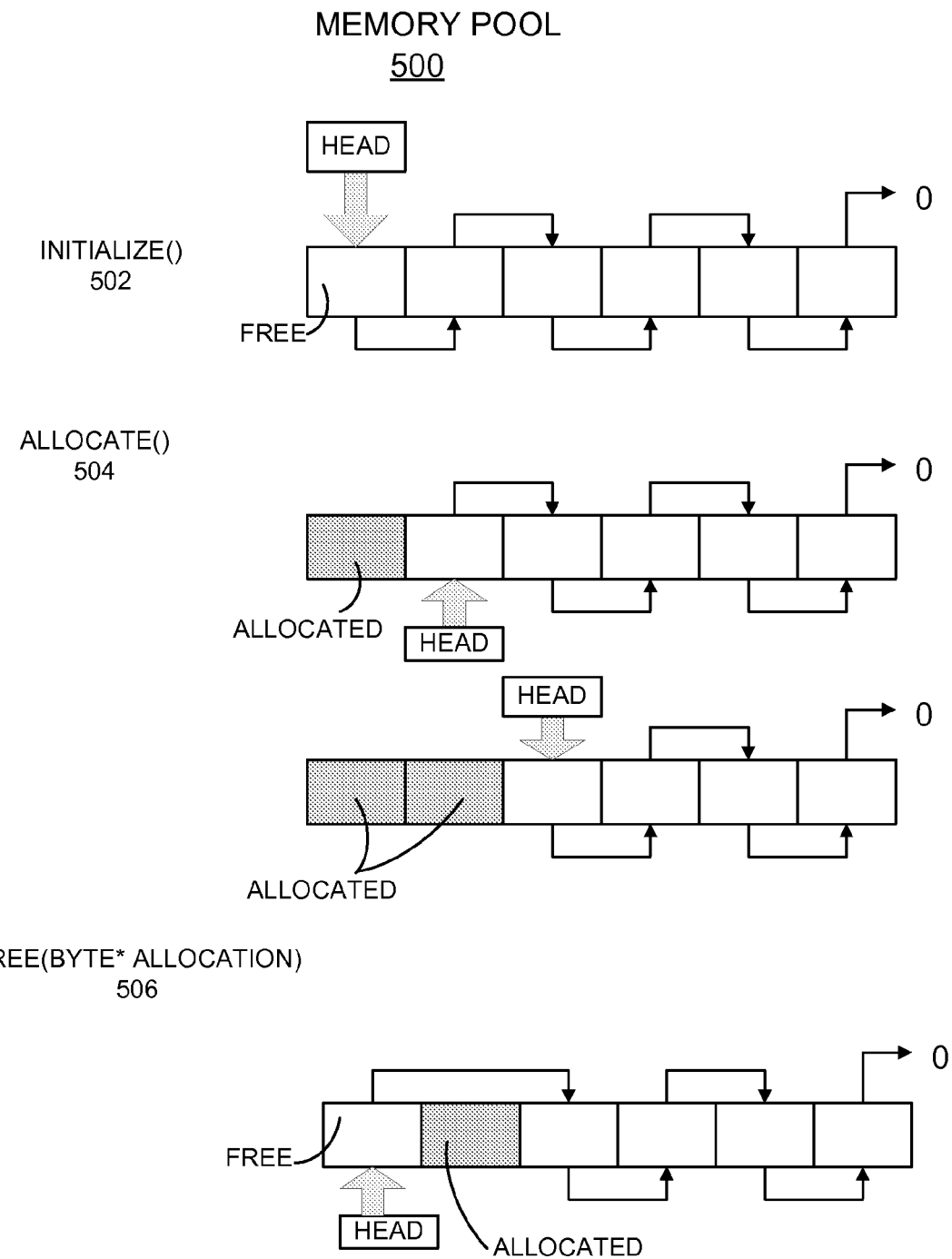
FIGS. 5A, 5B, and 5C are diagrams respectively illustrating example memory pool, pool manager, and mini-pool allocation used by the system of FIG. 1 for implementing deterministic memory allocation for shingled perpendicular magnetic recording (SMR) indirection tables in accordance with embodiments of the invention.

In accordance with features of the embodiments of the invention, the system 100 maintains multiple fixed-size memory pools enabling deterministic memory allocation for SMR indirection tables for host to physical mappings, for example, as illustrated in FIGS. 4, and 5A.

Referring to FIG. 4 and FIG. 5A, there are shown exemplary operations and an example memory pool 500 of the system 100 for implementing deterministic memory allocation for shingled perpendicular magnetic recording (SMR) indirection tables in accordance with embodiments of the invention.

In FIG. 4, an initialize step as indicated at a block 402 in FIG. 4, and in FIG. 5A, the memory pool 500 includes an initialize step 502 with a head pointer that is the only dedicated structure overhead, and a plurality of next pointers use a first word of each free allocation, and are built by setting Head=Null and calling Free(Byte* Allocation) repeatedly.

Figure 5B:
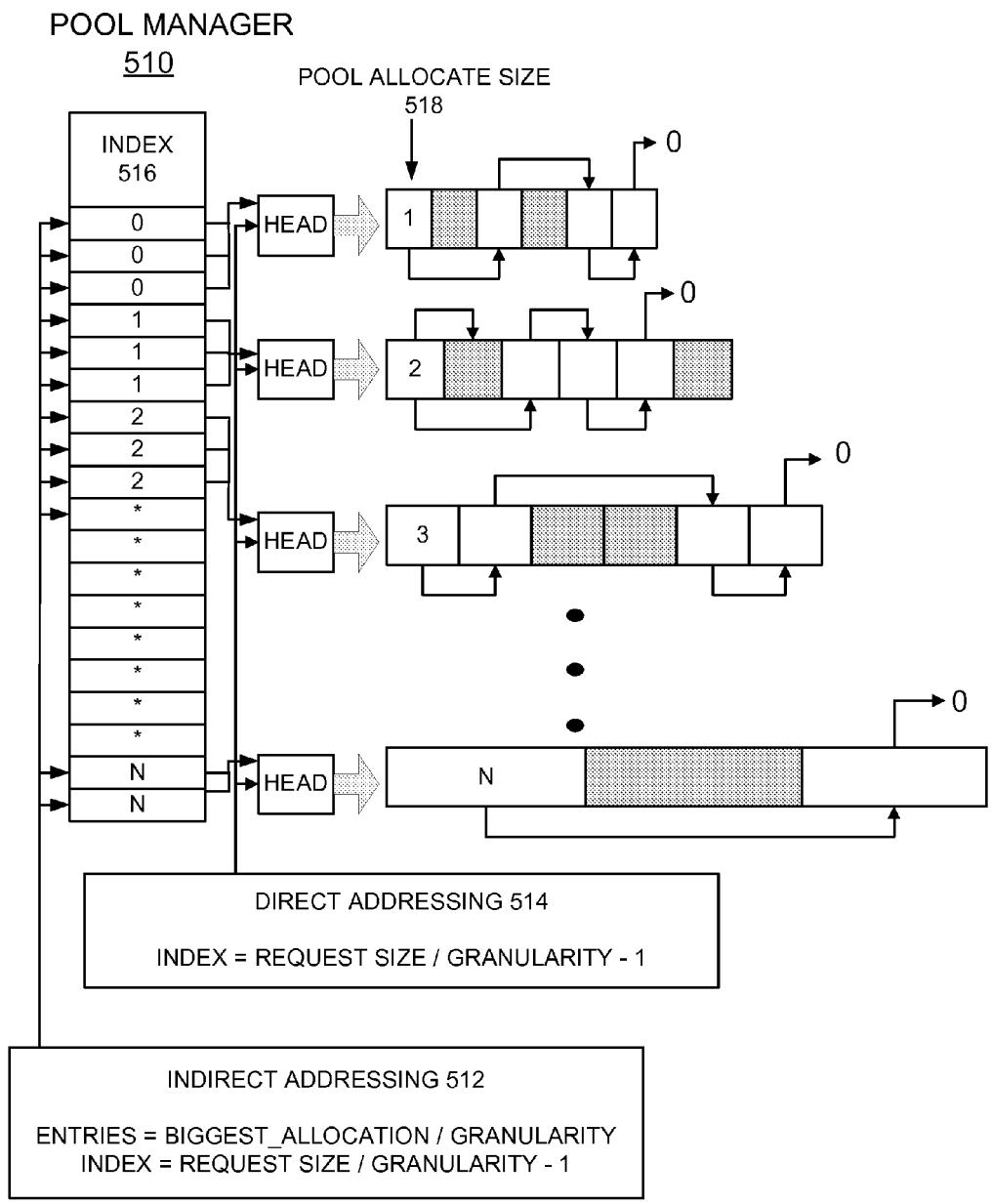
Figure 5C:
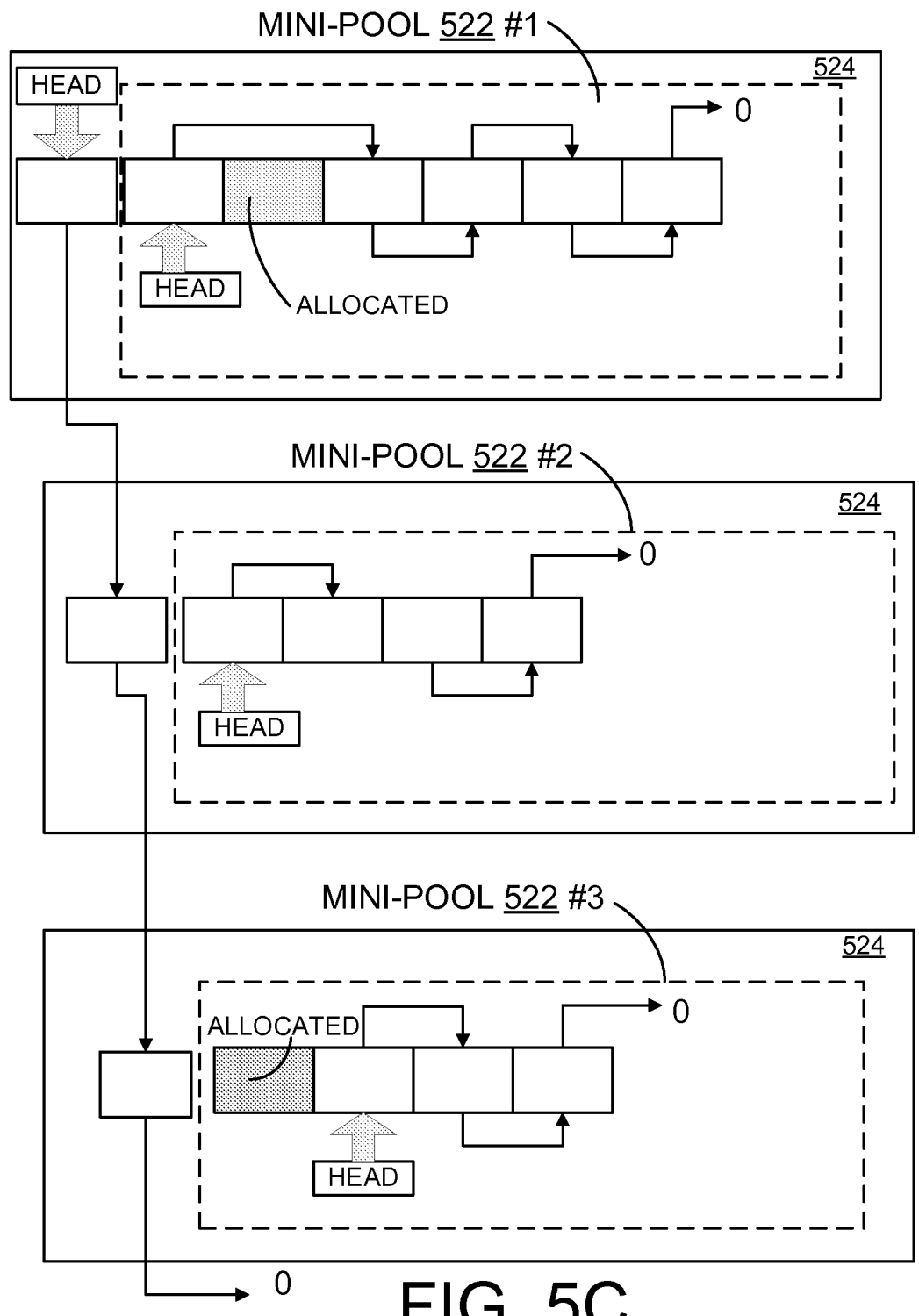

In FIGS. 5A, 5B, and 5C, at the initialize step 502, an allocate step 504, and a free allocation step 506 in FIG. 5A, each empty block represents an allocation status of free, and each shaded blocks represents an allocation status of allocated, and null pointers indicate a completely intact I-track.

An allocate step indicated at a block 404 in FIG. 4, and allocate 504 illustrated in FIG. 5A includes
Target=Head
if (Head!=NULL)
 Head=*Head (Point Head at the next allocation)
Return Target (Return the first allocation).

A free allocation step indicated at a block 406 in FIG. 4, and FREE(BYTE* ALLOCATION) 506 illustrated in FIG. 5A includes
*Allocation=Head (Point to where head is pointing)
Head=Allocation (Point Head at the freed allocation).

Referring to FIG. 5B, a memory pool manager 510 maintains multiple fixed-size pools to satisfy Indirection System requests, where the distribution of sizes is fixed. The memory pool manager 510 tries to find an exact match, but will return a larger allocation if necessary. Finding the correct size would normally require O(log 2N) operations, where N is the number of pool sizes. This becomes O(1) by making use of a size-to-index table, and as the pools are depleted, the worst-case time approaches O(N).

The memory pool manager 510 uses an indirect addressing 512, where

Entries=Biggest allocation/Granularity

Index=Request Size/Granularity−1 where Index 516 is applied to the Head to a Pool Allocate Size 1−N.

Alternatively, the memory pool manager 510 uses a direct addressing 514 through direct indexing when the allocation granularity is fixed and all pool sizes from 1*Granularity to N*Granularity are present, where Index=Request Size/Granularity−1.

Referring to FIG. 5C, mini-pool allocation includes a plurality of mini-pools 522, #1, 2, 3 shown in dotted line together with a respective standard allocation 524. The purpose of mini-pools 522 is to accommodate distributions of allocations which differ from fixed distribution. This often involves creating small allocation mini-pools for short periods of time, which will often revert back to the standard distribution in the steady state. A standard pool allocation optionally is cast as a mini-pool 522 with the first 4 bytes used as a chain pointer between mini-pools, such as mini-pools 522, #1, 2, 3. Mini-pool allocation 520 generally behaves the same as a regular fixed-allocation pool 518, 1-N as shown in FIG. 5B. Mini-pools 522, #1, 2, 3 optionally are controlled by a separate manager when necessary when memory is fully allocated and partition increases, while the overhead is higher for allocation and deallocation.

In accordance with features of the embodiments of the invention, the system 100 implements efficient emergency power outage (EPO) protection for shingled perpendicular magnetic recording (SMR) indirection data using data pointers in accordance with embodiments of the invention, for example, as illustrated in FIGS. 6, and 7. In event of EPO event, critical SMR indirection data in SRAM 136 includes pointers requiring minimal memory usage and minimizing the power needed for EPO protection.

In accordance with features of the embodiments of the invention, the indirection data is chained with one block pointing to another block. The data stored in SRAM 136 and DRAM 130 is a pointer to the flash 132 or disk stored indirection data, for example, in a range of 256K bytes. Writing the stored pointer requires minimal writing time and therefore less emergency power required. The small amount of critical data to be written is cheaper to implement with small capacitor emergency power and also typically is performed properly without errors.

Referring to FIG. 6, there are shown example context drops operations generally designated by the reference character 600 of the system 100 for implementing efficient emergency power outage (EPO) protection for shingled perpendicular magnetic recording (SMR) indirection data using data pointers in accordance with embodiments of the invention.

Referring also to FIGS. 7A, and 7B, there are shown example operations of the system 100 for implementing efficient EPO protection for shingled perpendicular magnetic recording (SMR) indirection data using data pointers in accordance with embodiments of the invention starting as indicated at a block 700. An EPO-safe buffer 602 within SRAM 136, such as 256 bytes, stores Metadata indicated as M1, M2, M3. There are actually two EPO-safe buffers 602; one EPO-safe buffer 602 is the active buffer that is written in the case of an EPO event. The other EPO-safe buffer 602 receives the updates and when completed, the hardware is updated to use the most recently completed EPO buffer.

As indicated at block 700, an Initial State includes an Indirection System committed to disk, with no intervening host writes and a full context drop 600 is a memory snapshot of the system, organized by I-track.

As indicated at a block 702 as each host write command completes, a Metadata entry for that command is written into the EPO-safe buffer 602. For example, the Metadata entry includes Host LBA, length, and drive LBA. Each write command metadata is appended to chronological list in DRAM 130. In FIG. 6, the host write command is represented by Cn and Metadata Block Bn with chaining of indirection data 610 including host write command and Metadata Blocks.

As indicated at a block 704, new write metadata is added to existing Metadata Block, such as adding M4, M5, (not shown) and the like in EPO-safe buffer 602. The stored metadata may span more than one physical block. The EPO-safe buffer 602 contains a valid length field and type description for each entry.

As indicated at a block 706, a pointer is stored in the EPO-safe buffer 602 to each of the current and previous Metadata Blocks. Two pointers are used to improve robustness beyond the hard read error rate. For the next update of EPO-safe buffer 602 entries are removed for previous Metadata Blocks. As indicated at a block 708, operations continue only keeping the last two metadata block pointers and last metadata in the EPO-safe buffer 602. Areas of indirection system are locked from host command access during updates.

Upon destage to the E-Region, such as E-Region 210, two copies of each newly generated metadata block are stored and a pointer to each is stored in the EPO-safe buffer 602 as indicated at a block 710. The metadata changes when moved to the E-Region. When metadata is dumped to the E-Region, pointers are used for the metadata dumps as well. Accumulation of dozens of these metadata dumps may occur before a partial context drop is done. This adds a second level of meta-data indirection to the system. Therefore, the EPO buffer 602 may contain both E-Region metadata, as well as write-twice cache metadata.

Referring to FIG. 6, partial context drops, such as example indirection data 610, are a chronological list of all the write commands since the last partial context drop, or full context drop. After a partial context drop, all metadata may be forgotten, except the location of the partial drop. This metadata for the partial drop location may be stored in the EPO buffer 602 or more likely in a reserved area on the disk 126. After a given number of partial drops, the entire context is written, after which all partial drops and EPO metadata may be forgotten.

Next return to Write-Twice Cache, such as Write-Twice Cache 208, and repeat process anew, only leaving the last two E-Region metadata block pointers as indicated at a block 712. Subsequent E-Region destaging stores pointers to the previous E-Region metadata block or blocks.

Referring to FIG. 7B, a power failure or emergency power outage (EPO) occurs as indicated at a block 720. The full context is loaded into DRAM 130 from the reserved are of disk as indicated at a block 722.

As indicated at a block 724, then the partial drops are replayed through the indirection system. Next, the E-Region writes are replayed through the indirection logic as indicated at a block 726. Finally the write-twice cache writes, if any, are replayed through the indirection logic as indicated at a block 728.

Figure 8A:
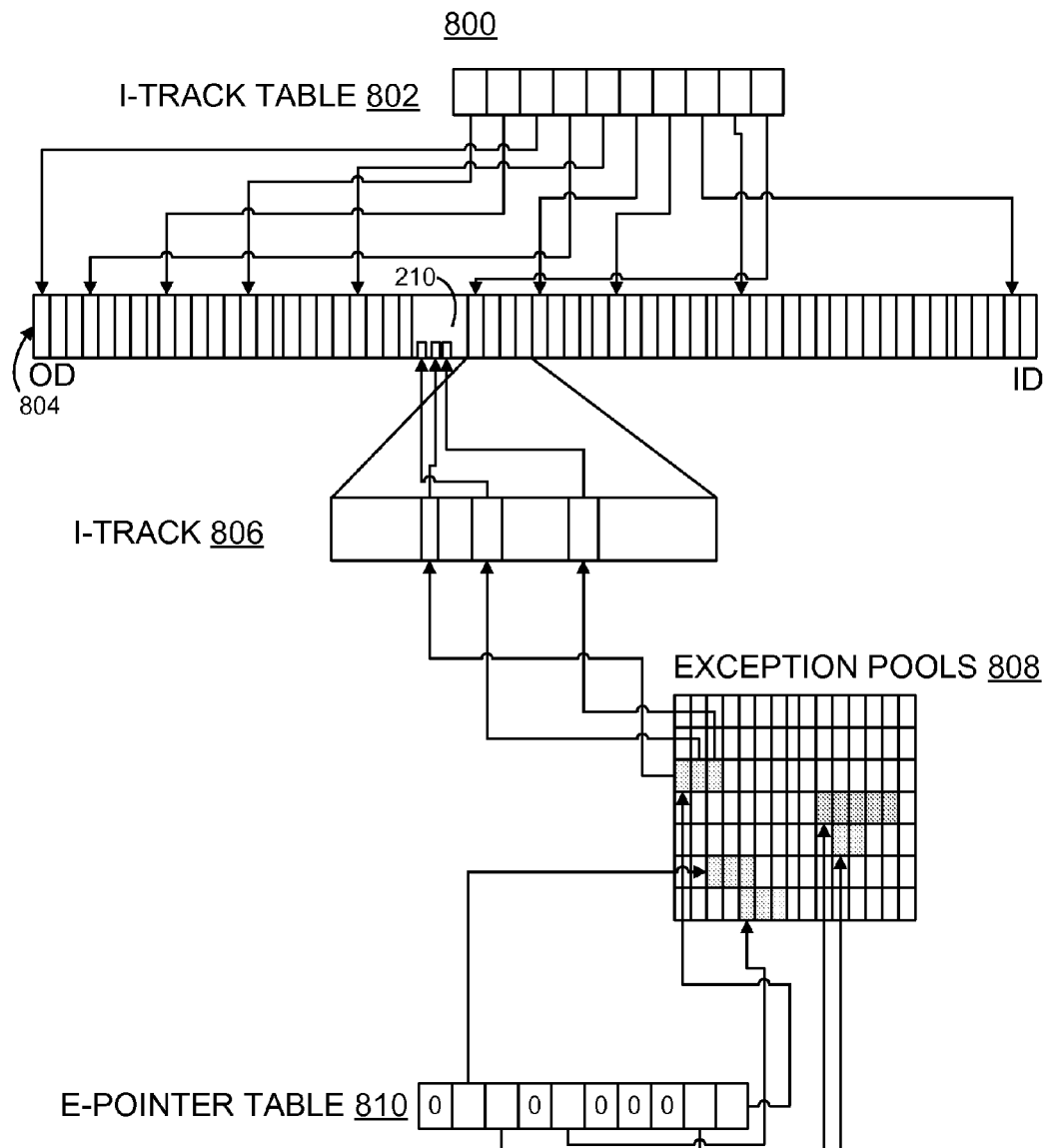
FIGS. 8A, 8B, and 8C are diagrams respectively illustrating an example memory exception pool together with I-track and E-pointer tables, an example exception list update with starting and updated memory exception pools, and an example E-pointer table with an example exception for a given I-track split into multiple split exception allocations using indirect pointers used by the system of FIG. 1 for implementing fast SMR indirection table updates in accordance with embodiments of the invention.
Figure 8B:
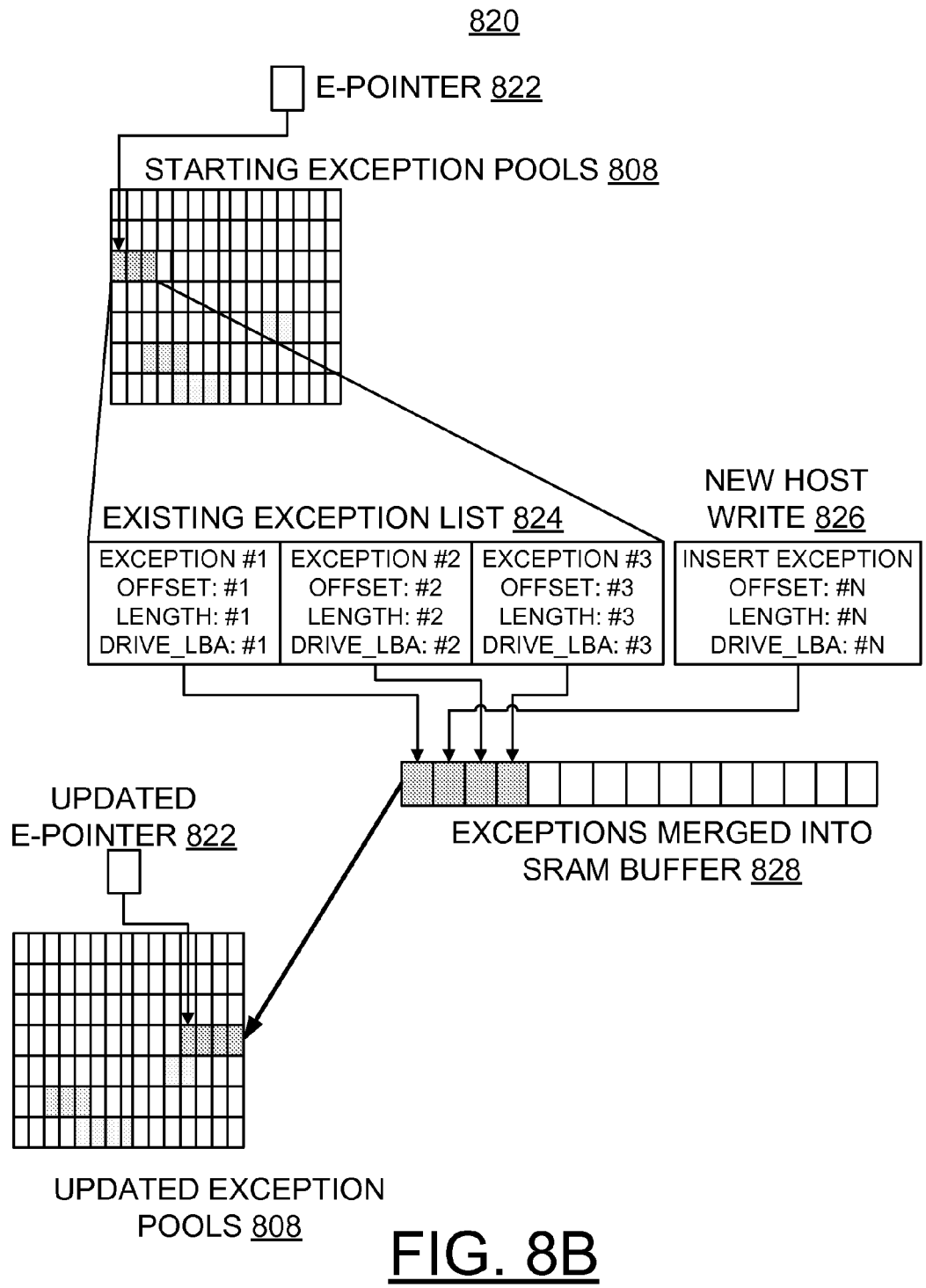
Figure 8C:
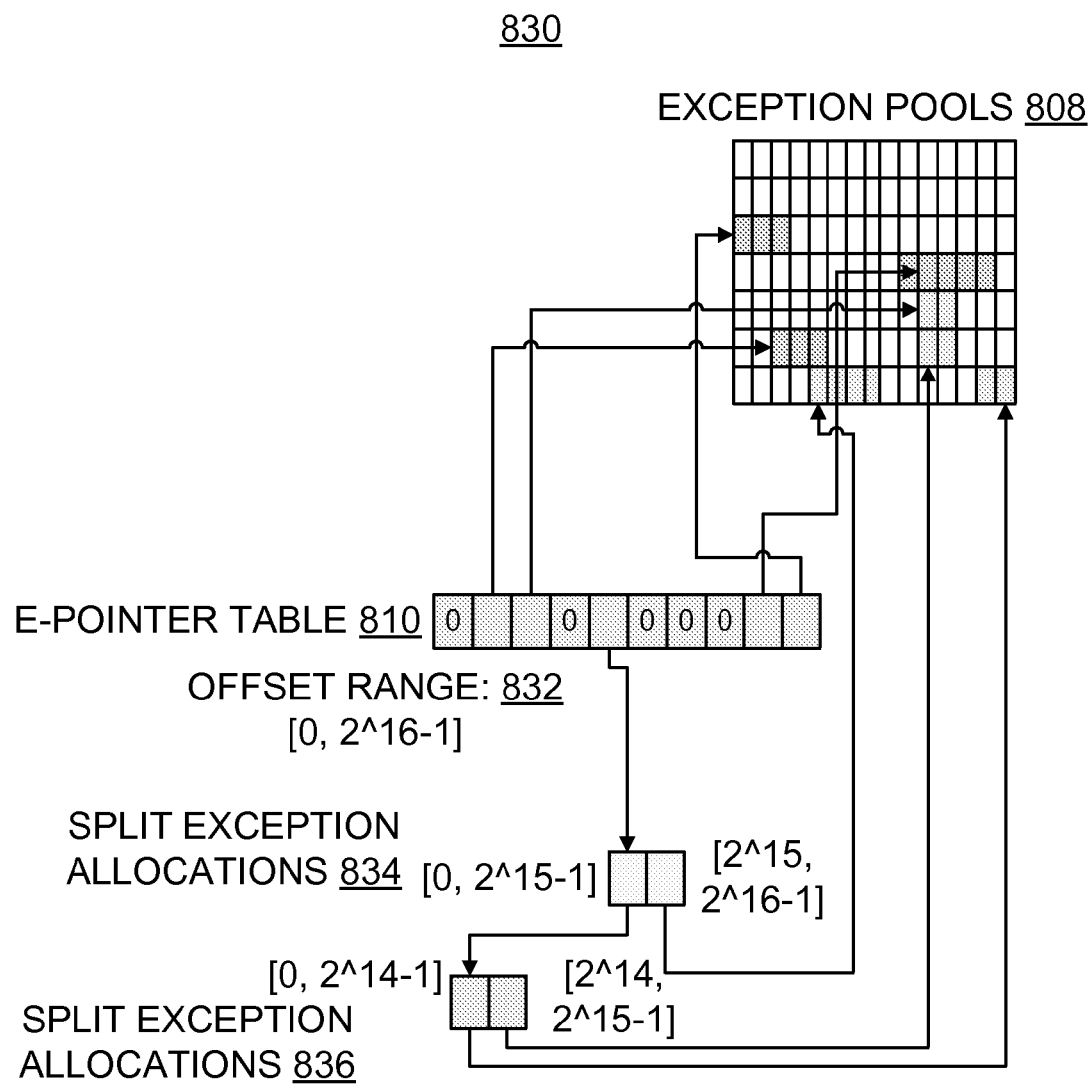

Referring to FIGS. 8A, 8B, and 8C, in FIG. 8A there are shown example memory exception pool operations 800 together with an example I-track table 802 and E-pointer table 810 with memory exception pools 808. In FIG. 8B, there are shown example exception list update operations 820 with memory exception pools 808. In FIG. 8C there are shown memory exception pools 808, with example E-pointer splits 830 with an example exception E-pointer table 810 for a given I-track split into multiple allocations using indirect pointers in accordance with embodiments of the invention; and Referring also to FIG. 9 there are shown example operations of the system 100 for implementing fast SMR indirection table updates in accordance with embodiments of the invention. As indicated at a block 900, starting operations begin an initial I-Track table size determined by granularity of I-track, a set entry size, such as an entry size <=32-bits. The I-Track table providing base drive start location of sequential set of host LBAs is linearly indexed for fast lookups.

In FIG. 8A the example memory exception pool operations 800 illustrate an example I-track table 802 with an I-track 804, an I-track region 806, Exception pools 808, and E-pointer table 810. As indicated at a block 902, the E-pointer table 810 provides pointers to exceptions or deltas for each I-track. Host LBAs are mapped to alternate locations, E-region 210 or Write-Twice Cache 208 shown in FIG. 2A, E-pointer table 810 with identical indexing to I-track table or 1:1 mapping provides the same storage requirements, and E-pointer table entries of 0 or null pointers indicating completely intact I-track.

As indicated at a block 902, the exception list for I-track includes, for example, 8-byte deltas sorted by offset from the start of the I-track, where deltas do not overlap and my be split or deleted by insertions into the list. It should be understood that delta is not limited to the example 8-byte delta, the delta could be larger or smaller, such as by changing the size of the length or LBA fields. Each set-sized delta or exception includes an offset, length, to provide full addressability of, for example, 64K LBA I-tracks, where for example, an offset is represented by 16 bits.

FIG. 8B, there are shown example exception list update operations 820. An E-Pointer 822 is shown with starting memory exception pools 808. An existing exception list 824 included in the starting memory exception pools 808 includes exceptions #1-3, each including a respective offset, length, and drive LBA. A new host write 826 is insert exception at offset N, length N, and drive LBA N, is inserted or merged into the exception list 824, between the starting exception #1 and #2, as shown in exceptions merged into SRAM buffer 828. An updated E-Pointer 822 is shown with the updated memory exception pools 808 including the merged exception of the new host write 822.

As indicated at a block 906, the exception list update includes the new host write exception merged into the SRAM buffer shown at 828 in FIG. 8B. At block 906 the exception list 828 is written into the updated or new exception pool in pools 808, with an E-pointer updated to the new pool, and the old exception pool freed, such as shown in FIG. 8B.

In FIG. 8C, example E-pointer split operations 830 are shown with memory exception pools 808, an example exception E-pointer table 810 with an illustrated Offset Range: [0, 2^16-1] for a given I-track split into multiple allocations 834 and 836 with respective Offset Ranges:
[0, 2^15-1] [2^15, 2^16-1] and [0, 2^14-1] [2^14, 2^15-1] using indirect pointers as shown in accordance with embodiments of the invention.

As indicated at a block 908, splits are provided with the exceptions for a given I-track optionally split into multiple allocations using indirect pointers. Each split divides the LBA offset in two at each level, such as the illustrated multiple allocations 834 and 836 in FIG. 8C. The number of levels is limited to control overhead and memory consumption.

As indicated at a block 910, all outstanding write metadata are periodically written as a simple chronological list since the last incremental or full context drop, to the reserved area. The number of incremental context drops between full context drops is constrained to provide an acceptable rebuild time, such as illustrated in FIG. 6.

Figure 10:
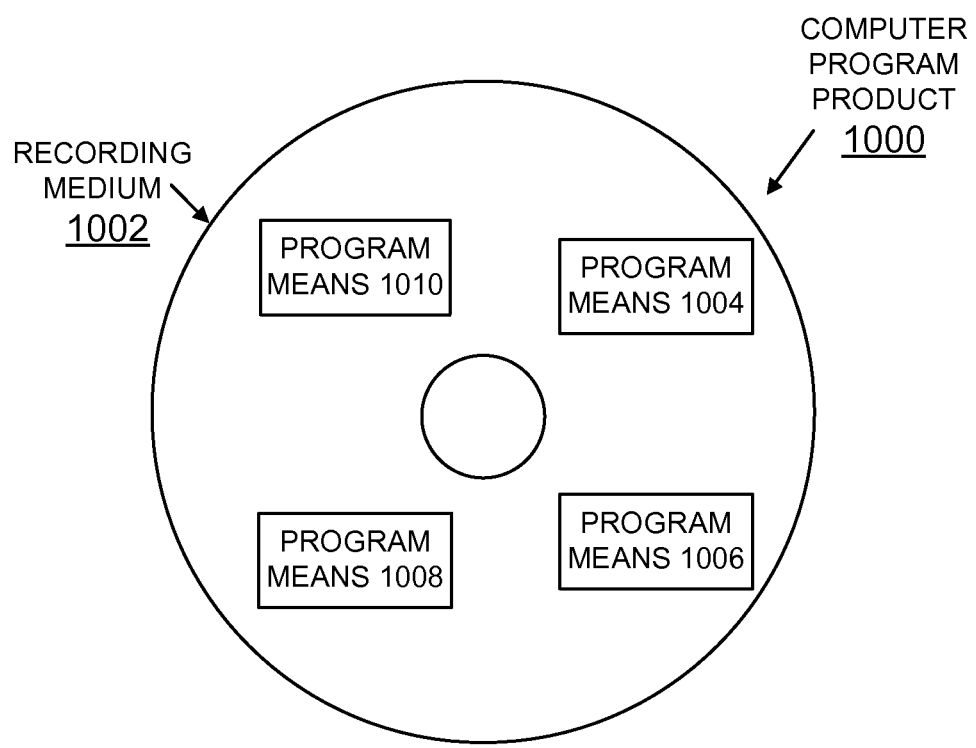
FIG. 10 is a block diagram illustrating a computer program product in accordance with embodiments of the invention.

Referring now to FIG. 10, an article of manufacture or a computer program product 1000 of the invention is illustrated. The computer program product 1000 includes a computer readable recording medium 1002, such as, a floppy disk, a high capacity read only memory in the form of an optically read compact disk or CD-ROM, a tape, or another similar computer program product. Computer readable recording medium 1002 stores program means or control code 1004, 1006, 1008, 1010 on the medium 1002 for carrying out the methods for implementing SMR indirection tables including implementing deterministic memory allocation for shingled perpendicular magnetic recording (SMR) indirection tables, emergency power outage (EPO) protection for SMR indirection data using data pointers, and for efficiently providing fast SMR indirection updates of the embodiments of the invention in the system 100 of FIG. 1.

A sequence of program instructions or a logical assembly of one or more interrelated modules defined by the recorded program means or control code 1004, 1006, 1008, 1010, direct the system 100 for implementing SMR indirection data methods of the embodiments of the invention.

While the present invention has been described with reference to the details of the embodiments of the invention shown in the drawing, these details are not intended to limit the scope of the invention as claimed in the appended claims.

What is claimed is:

1. A method for implementing indirection tables and providing enhanced updates of the indirection tables for persistent media comprising:
   using a plurality of memory pools to store indirection data;
   providing an exception pointer table and providing a respective exception list pointer to each of a plurality of exception lists;
   sorting predetermined-size exception entries of each said exception list by an offset from a start of an I-Track and storing each said exception list in one said memory pool; and
   providing an insert exception entry for a new host write; and merging the insert exception entry into an initial exception list to provide an updated exception list using an offset of the insert exception entry.

2. The method as recited in claim 1 wherein the persistent media includes a Shingled Disk Drive.

3. The method as recited in claim 1 wherein providing an exception pointer table for providing a respective pointer to each of a plurality of exception lists includes providing indirection tables memory allocation control logic coupled to a controller to control storing of the indirection data.

4. The method as recited in claim 1 wherein providing an insert exception entry for a new host write; and merging the insert exception entry into an initial exception list to provide an updated exception list using an offset of the insert exception entry includes merging said updated exception list into a static random access memory (SRAM).

5. The method as recited in claim 4 includes freeing the memory pool for the initial exception list in dynamic random access memory (DRAM).

6. The method as recited in claim 4 includes writing the updated exception list into a new memory pool in dynamic random access memory (DRAM).

7. The method as recited in claim 5 includes providing an updated exception list pointer to the new memory pool.

8. The method as recited in claim 1 wherein sorting predetermined-size exception entries of each said exception list by an offset from a start of an I-Track and storing each said exception list in one said memory pool includes providing each predetermined-size exception entries with said offset, a length and a drive Logical Block Address (LBA).

9. The method as recited in claim 6 wherein sorting predetermined-size exception entries of each said exception list by an offset from a start of an I-Track and storing each said exception list in one said memory pool includes using a split and indirect pointers for providing multiple exception lists for one said I-Track.

10. The method as recited in claim 1 wherein merging the insert exception entry into an initial exception list to provide an updated exception list using an offset of the insert exception entry includes keeping said predetermined-size exception entries in order using said offset of each of said predetermined-size exception entries.

11. An apparatus for implementing indirection tables and providing enhanced updates of the indirection tables for persistent media comprising:
   a plurality of memory pools to store indirection data;
   an exception pointer table providing a respective exception list pointer to each of a plurality of exception lists;
   each said exception list including predetermined-size exception entries being sorted by an offset from a start of an I-Track and each said exception list being stored in one said memory pool; and
   an insert exception entry for a new host write being merged into an initial exception list to provide an updated exception list using an offset of the insert exception entry.

12. The apparatus as recited in claim 11 wherein the persistent media includes a Shingled Disk Drive.

13. The apparatus as recited in claim 11 includes a controller, and indirection tables memory allocation control logic coupled to said controller to control storing of the indirection data in said plurality of memory pools.

14. The apparatus as recited in claim 11 wherein said insert exception entry for a new host write being merged into an initial exception list to provide an updated exception list includes said updated exception list being stored in a static random access memory (SRAM).

15. The apparatus as recited in claim 14 includes said updated exception list being written into a new memory pool in dynamic random access memory (DRAM).

16. The apparatus as recited in claim 14 includes the memory pool for said initial exception list being freed in dynamic random access memory (DRAM).

17. The apparatus as recited in claim 11 includes a split and indirect pointers for providing multiple exception lists for one said I-Track.

18. A data storage system comprising:
   a persistent media;
   a controller, and indirection tables memory allocation control logic coupled to said controller for implementing indirection tables and providing enhanced updates of the indirection tables for persistent media;
   said controller and said indirection tables memory allocation control logic using a plurality of memory pools for storing indirection data; an exception pointer table providing a respective exception list pointer to each of a plurality of exception lists; each said exception list including predetermined-size exception entries being sorted by an offset from a start of an I-Track and each said exception list being stored in one said memory pool; and an insert exception entry for a new host write being merged into an initial exception list to provide an updated exception list using an offset of the insert exception entry.

19. The data storage system as recited in claim 18 includes said updated exception list being stored in a static random access memory (SRAM).

20. The data storage system as recited in claim 18 includes said updated exception list being written into a new memory pool in dynamic random access memory (DRAM).

* * * * *